Jan. 16, 1968  P. K. SCHILLING  3,363,820
PLASTIC GLASSES
Filed May 28, 1965

INVENTOR
PAUL K. SCHILLING
BY
ATTORNEY

United States Patent Office 3,363,820
Patented Jan. 16, 1968

3,363,820
PLASTIC GLASSES
Paul K. Schilling, St. Paul, Minn., assignor to
Plastics, Inc., St. Paul, Minn.
Filed May 28, 1965, Ser. No. 459,633
7 Claims. (Cl. 229—1.5)

This invention relates to an improvement in drinking glasses and deals particularly with a thin wall plastic glass which may be discarded after use.

With rises in labor costs, some establishments have found that it is less costly to purchase disposable plastic glasses and to throw them away after use than to wash them. This is particularly true in conjunction with glasses used for serving highballs and cocktails on airplanes. It has become common practice for airlines to offer a highball or cocktail to passengers on long flights. In the past this has required carrying and storing a great number of glasses which must be stored, washed after use, and returned to the airplane. Due to the fact that they were made of glass, the use of such glasses resulted in the addition of quite a appreciable amount of cargo weight. Due to the fact that glasses of this type are not nestable, they also require a considerable space.

As a result, as soon as my thin lightweight disposable plastic glasses were developed, they became almost an instantaneous success.

An objection of the present invention lies in the provision of a thin-walled glass which is constructed in a manner so that the glasses may nest readily one within the other. This is accomplished by positioning the bottom wall of the glass spaced from the lower end of the tapered wall of the glass so that the external diameter of the lower end of the tapered sleeve does not exceed the inner diameter of the tapered wall just above the bottom wall. With this arrangement, the bottom wall of the glass actually rests upon the bottom wall of the glass next below so that the glasses can nest evenly and properly in a stack.

A further object of the present invention lies in the provision of a glass which may be made at a low enough cost so that they can be discarded after use. By forming all of the walls of substantially uniform thickness throughout, a thin-walled article may be produced which may be sold at a relatively low cost.

Another feature of the present invention resides in the provision of a glass having a dome-shaped bottom which is preferably provided with a slight upwardly projecting knob at its center. It has been found that when a glass of this type is used for containing a carbonated beverage, there is a tendency for tiny bubbles to collect on the central knob and raise to the surface in a stream, adding to the attractiveness of the appearance.

Figure 1:
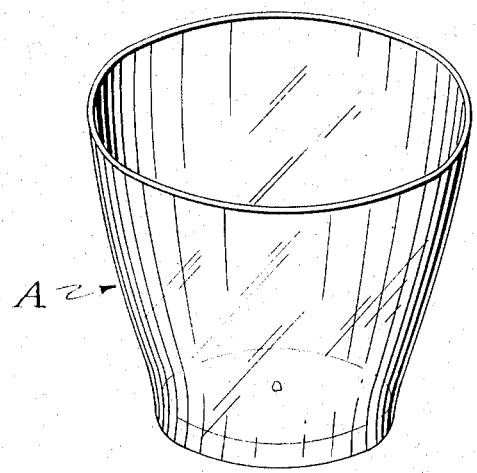
Figure 2:
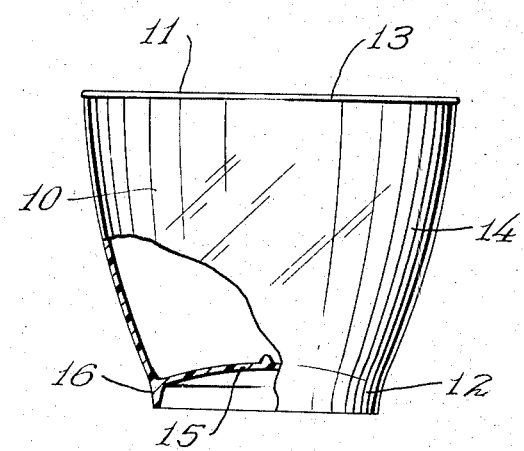
Figure 3:
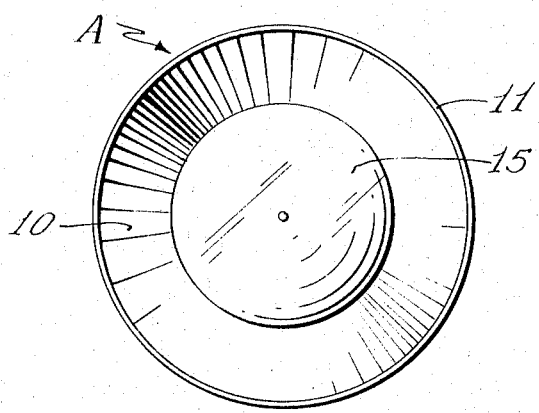
Figure 4:
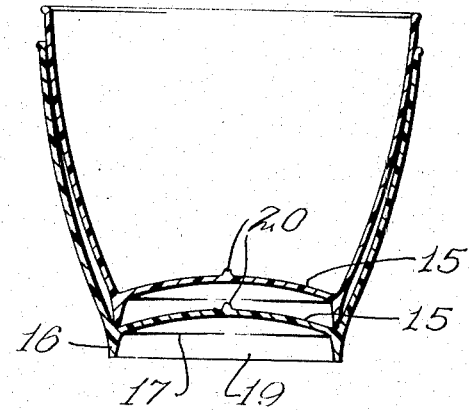

These and other objects and novel features of the present invention may be more clearly and fully setforth in the following specification and claims:

In the drawings forming a part of the specification;
FIGURE 1 is a perspective view of the glass.
FIGURE 2 is a side elevational view of the glass, a portion being broken away to show the interior construction.
FIGURE 3 is a top-plan view of the glass.
FIGURE 4 is a vertical sectional view through a pair of glasses, showing the manner in which they nest together.

The glasses are indicated in general by the letter A. In preferred form, the structure comprises a tapered wall 10 having an enlarged diameter upper end 11 and relatively small diameter lower end 12. The upper end 11 is preferably provided with a slightly enlarged bead 13 encircling the periphery to avoid any rough edge at this point of the glass.

As is perhaps best illustrated in FIGURE 2 of the drawings, the wall 10 is bulged outwardly slightly as indicated at 14 between the ends of the wall. This is mainly for enhancing the appearance of the glass. A bottom wall 15 is formed inwardly with the side wall 10, this bottom wall being spaced from the lower end of the wall 10 as indicated in FIGURES 2 and 4. In the form illustrated, the lower end of the wall 10 which projects below the bottom wall 15 and which is indicated at 16 is flared out slightly toward a cylindrical surface. The purpose of this flare is not only to enhance the appearance of the glass and make it more stable, but also to permit a decrease in thickness of the portion of the side wall extending below the bottom wall 15. As will be understood, the hollow undersurface of the glass must be formed from a projection in the mold and the inner surface of this lower wall portion cannot be tapered in the same manner as the inner surface of the side wall above the bottom wall 15. As indicated in FIGURE 4, the inner surface of the lower wall portion 15 is provided with a generally cylindrical proportion 17 and a slightly greater diameter lower end portion 19 also having a substantially cylindrical inner surface. A small upwardly projecting knob 20 is preferabaly provided at the center of the slightly dome-shaped bottom wall 15. This knob is thus at the highest point of the bottom wall. Apparently, this knob tends to collect small bubbles when the glass is used to contain carbonated beverages, which bubbles then rise in a stream to the surface of the liquid.

As an actual example, one form of glass which is being produced in tremendous volume, one such glass is approximately three inches in total height, approximately three and one-half inches in outside diameter at its upper end and approximately two and one-eighth inches in outside diameter at its lower end. Thus, the glass is substantially one and one-half times larger at its upper end than its lower end. The inside diameter of the wall at the upper surface of the dome-shaped bottom wall 15 is no greater than the outside diameter of the wall at its lower end. The upper surface of the bottom wall 15 at its outer periphery is approximately five-sixteenths of an inch from the bottom surface of the wall 10. As a result, when one glass is placed within another, the bottom surface of the upper wall actually rests upon the upper surface of the bottom wall of the lower glass, and in actual practice the rim of the lower glass is slightly spaced from the periphery of the upper glass although this spacing is difficult to show in the drawings, and it is only a few thousands of an inch. The thickness of the major portion of the wall is approximately thirty-four thousandths of an inch.

While the measurements given are approximate, it will be seen that four glasses which are nested one above the other require less than an inch more axial space to store than a single glass. At the same time, glasses of this type weigh less than three-quarters of an ounce a piece. The plastic is sufficiently flexible so that it does not break easily and it can hold a reasonably large quantity of liquid.

It will be seen that if a hundred such glasses are required on a flight, these glasses can be stored in a space three and one-half inches in diameter and less than a yard long. Glasses of a similar height arranged in individual cells in a container would require a box almost a yard square and three inches high, not counting the thickness of the dividers used between the glasses. Obviously, the weight of the glasses will be a small fraction of the weight of the glasses previously used. The advantages to an airline in the use of such glasses is readily apparent.

In addition to the advantages mentioned, others could be listed. For example, there is always a certain amount of loss involved due to breakage of the conventional glasses previously. A considerable number of plastic glasses can be purchased for the loss incurred in breaking a single conventional glass. There is also a considerable loss to the airlines due to souvenir hunting passengers who take the conventional glasses because they usually have the monogram or insignia of the airline etched or otherwise formed therein. The stealing of plastic glasses is encouraged by the airline, as otherwise they must be disposed of by the airlines themselves.

In accordance with the patent statutes, I have described the principles of construction and operation of my improvement in drinking glasses, and while I have endeavored to set forth the best embodiment thereof I desire to have it understood that changes may be made within the scope of the following claims without departing from the spirit of my invention.

I claim:
1. A disposable drinking tumbler comprising:
   a tapered wall of plastic having a diameter at its upper extremities which is substantially greater than at its lower extremity and which continuously increases in diameter from bottom to top,
   a bottom wall extending across the lower portion of said tapered wall spaced upwardly from the lower edge thereof,
   the outer diameter of the lower end of said tapered wall being smaller than the inner diameter of said wall above said bottom wall, the tapered wall of an identical tumbler resting upon said bottom and the tapered wall of the tumbler being spaced from the tapered wall of an identical tumbler resting upon said bottom wall with the tumblers axially aligned, whereby similar glasses may freely rest.
2. The structure of claim 1 and in which the wall thickness of said tapered wall and said bottom wall are substantially uniform.
3. The structure of claim 1 and in which said bottom wall is slightly dome-shaped.
4. A disposable and nestable drinking tumbler comprising,
   a tapered wall of thin plastic material having an upper diameter substantially one and one-half times greater than its bottom diameter and which continuously increases in diameter from bottom to top,
   a bottom wall of thin plastic material joined integrally at its margin to said tapered wall spaced above the lower edge of said tapered wall,
   the lower periphery of said tapered wall flaring slightly toward a cylindrical surface, and
   the outer diameter of the lower end of said tapered wall being no greater than the internal diameter of said tapered wall above said bottom wall,
   the tapered wall of one tumbler being spaced from the tapered wall of another identical tumbler resting upon the bottom wall thereof when the tumblers are axially aligned,
   whereby similar tumblers may nest freely together with the lower edge of the tapered wall of one glass resting upon the upper surface of said bottom wall of the glass next below.
5. The structure of claim 4 and in which the tapered wall is bowed outwardly slightly between said bottom wall and the upper edge of said tapered wall.
6. The structure of claim 4 and in which said bottom wall is slightly dome-shaped.
7. The structure of claim 1 in which the bottom wall is slightly dome-shaped and includes a small upward projection at its center.

References Cited

UNITED STATES PATENTS

| | | | |
|---|---|---|---|
| 2,816,697 | 12/1957 | Amberg | 229—1.5 |
| 2,982,440 | 5/1961 | Harrison | 229—1.5 |
| 3,080,997 | 3/1963 | Brown | 220—97 |
| 3,139,213 | 6/1964 | Edwards | 229—1.5 |
| 3,212,757 | 10/1965 | Martin et al. | 259—4 |

FOREIGN PATENTS

| | | |
|---|---|---|
| 16,878 | 8/1904 | Great Britain. |
| 1,321,330 | 2/1963 | France. |

DAVIS T. MOORHEAD, *Primary Examiner.*